United States Patent [19]
Sawahashi et al.

[11] Patent Number: 5,715,235
[45] Date of Patent: Feb. 3, 1998

[54] COMMUNICATION SYSTEM CAPABLE OF PERFORMING FDMA TRANSMISSION

[75] Inventors: Mamoru Sawahashi, Yokosuka; Tomohiro Dohi; Fumiyuki Adachi, both of Yokohama, all of Japan

[73] Assignee: NTT Mobile Communications Network Inc., Tokyo, Japan

[21] Appl. No.: 342,582

[22] Filed: Nov. 21, 1994

[30] Foreign Application Priority Data

Nov. 26, 1993 [JP] Japan .................... 5-295892

[51] Int. Cl.⁶ .................... H04J 11/00; H04B 7/208
[52] U.S. Cl. .................... 370/206; 370/203; 370/344; 370/480; 455/17
[58] Field of Search .................... 370/29, 69.1, 95.1, 370/123, 18, 21, 110.4, 100.1, 104.1, 70, 50, 206, 294, 344, 431, 342, 343, 208, 527, 503, 319, 480, 210, 535; 455/33.1, 115, 15, 17; 375/235

[56] References Cited

U.S. PATENT DOCUMENTS

| 4,578,815 | 3/1986 | Persinotti ................... 455/15 |
| 5,117,502 | 5/1992 | Onoda et al. ................. 455/33.1 |
| 5,193,223 | 3/1993 | Walczak et al. ............... 455/115 |
| 5,245,340 | 9/1993 | Loo et al. .................... 341/118 |

FOREIGN PATENT DOCUMENTS

| 63-177630 | 7/1988 | Japan . |
| A-06-021722 | 1/1994 | Japan . |
| WO-A-9002452 | 3/1980 | WIPO . |
| WO-A-8502745 | 6/1993 | WIPO . |

OTHER PUBLICATIONS

Bingham, John A.C., "Multicarrier Modulation for Data Transmission: An Idea Whose Time Has Come," IEEE Communications Magazine, vol. 28, No. 5, pp. 5–14, May 1990.

Proceedings of 39th IEEE Vehicular Technology Conference, California (US), vol. 1, May 1–3, 1989 New York (US), pp. 63–72, XP 000073160 P. Estabrook & B.B.Lusignan 'The Design of a Monile Radio Receiver using a Direct Conversion Architecture'.

Patent Abstracts of Japan, vol. 12 No. 449 (E–686) Nov. 25, 1988.

*Primary Examiner*—Wellington Chin
*Assistant Examiner*—Melissa Kay Carman
*Attorney, Agent, or Firm*—Rogers & Wells

[57] ABSTRACT

A communication apparatus is disclosed which is capable of measuring levels of carrier signals used in adjacent zones during telecommunication with a small circuit scale, and capable of simultaneously transmitting/receiving to FDMA-system signals through a plurality of communication channels. All of transmission signals received through the communication channels under use are wholly converted into an intermediate signal by a mixer. The intermediate signal is quadrature-detected and then A/D-converted into digital I/Q-channel signals by A/D-converters. Thereafter, the digital I/Q-channel signals are frequency-converted by frequency converting circuits in such a manner that center frequencies of these I/Q-channel signals become zero, two sets of I/Q-channel signals may be demodulated by two sets of demodulating circuits. Otherwise, one of these I/Q-channel signals is demodulated by a single demodulating circuit, and the other is level-detected by a level detecting circuit.

17 Claims, 7 Drawing Sheets

COMMUNICATION SYSTEM CAPABLE OF PERFORMING FDMA TRANSMISSION

BACKGROUND OF THE INVENTION

1. Field of the Invention

The present invention generally relates to communication method/apparatus/system used in the FDMA (frequency division multiple access) transmission system. More specifically, the present invention is directed to a communication apparatus for receiving a carrier signal transmitted from another base station during telecommunication operation and/or for measuring a level of this carrier signal, to communication method/system for performing telecommunication operation between a plurality of base stations as well as mobile stations.

2. Description of the Related Art

Conventionally, the analog signal transmission systems have been widely utilized in the mobile telecommunication services such as portable telephones and automobile telephones. Very recently, the digital signal transmission systems are commercially available in which as the radio (wireless) accessing method, the TDMA (time division multiple access) system for time-multiplexing a plurality of users to transmit the information with a single carrier frequency is employed. In this TDMA system, the timing at which one user receives the transmission signal is present within a certain time range slot of 1 frame. The presently available mobile communication system is arranged by the cellular telephone system. Accordingly, a mobile station is required to have a judging function as to the cell to which the own mobile station belongs. To achieve this judging function, the reception levels of the signals transmitted from the plural base stations must be measured. When the same frequency as that of the signal under communication is used by another user belonging to another cell, the interference signal levels caused from this user would be increased. When the interference signal levels exceed a preselected SIR (signal-to-interference ratio), the present communication channel is switched into other communication channels with different frequencies. As a consequence, the mobile station is required to detect the levels of the carrier signals used in the peripheral monitoring zones which are designated by the base station during the telecommunication.

Figure 1:
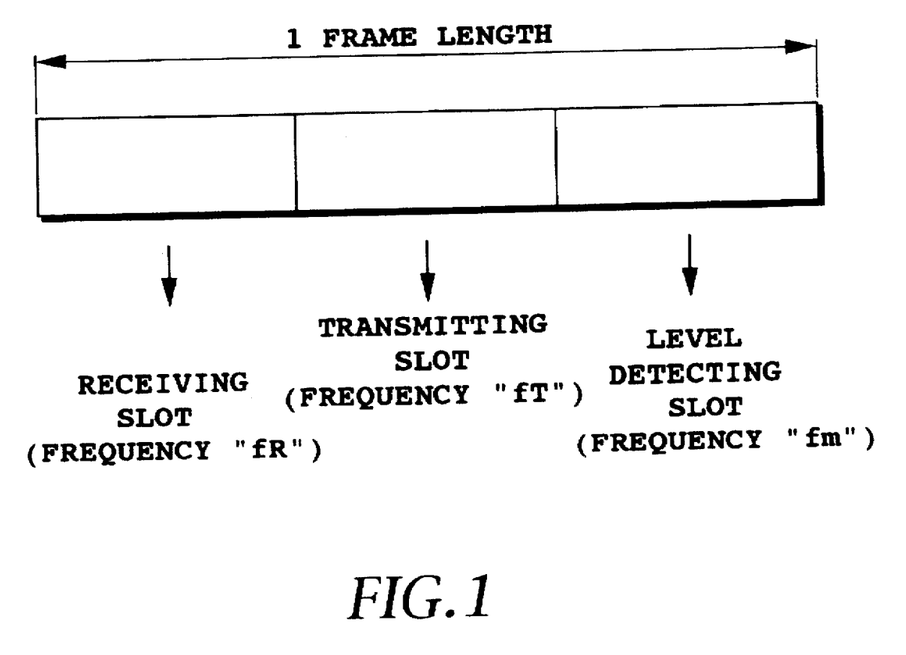
FIG. 1 is a schematic explanatory diagram for showing a structure of a transmission frame employed in the FDMA transmission system.
Figure 2:
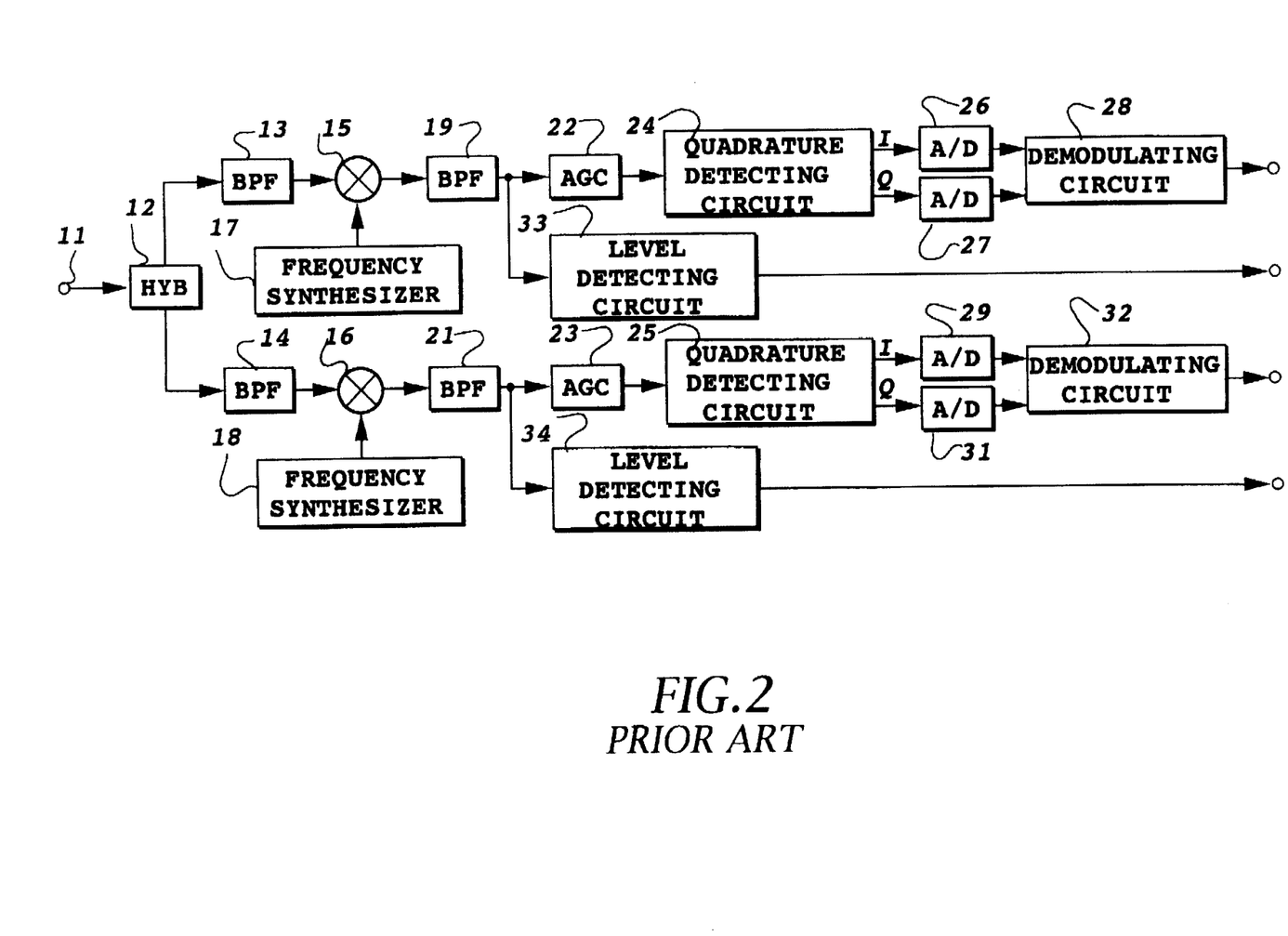
FIG. 2 schematically shows the circuit block diagram of the conventional receiving circuit of the mobile station used in the FDMA transmission system.

In accordance with the TDMA transmission system, as illustrated in FIG. 1, the levels of the reception signals from the peripheral zones may be detected within the empty slot (namely, level detecting slot) provided other than the receiving slot and the transmitting slot. During this empty slot, the frequency of the frequency synthesizer is made coincident with the designation carrier for monitoring the level, the signal level detection is carried out within this empty slot, and a plurality of detected sampling values are averaged to obtain the level of the reception signals. As described above, since the empty slot is employed in the TDMA transmission system, a single receiver can detect the levels of the carrier signals having the different frequency from that of the carrier signal under communication. However, in the SCPC/FDMA (single channel per carrier/frequency division multiple access) system where a single channel with 1 carrier is used by 1 user, since the single channel is always used, two series of signal receiving units are required, as shown in FIG. 2, in order to detect the levels of the different carrier signals. That is, the signal received from the input terminal 11 is subdivided by the hybrid 12 into two signal portions which will then be supplied to the bandpass filters 13 and 14. The outputs from the bandpass filter 13 and 14 are frequency-mixed with the respective local signals of the frequency synthesizers 17 and 18 in the mixers 15 and 16. Then, the frequency-converted output signals are filtered by the bandpass filters 19 and 21. The output signals filtered from the bandpass filters 19 and 21 are amplified by the automatic gain control applifiers 22 and 23, and thereafter quadrature-detected by the quadrature detecting circuit 24 to obtain the baseband signals of the I channel and the Q channel. The respective I/Q-channel baseband signals derived from the quadrature detecting circuit 24 are A/D-converted by the A/D converters 26 and 27 into the digital baseband signals which are supplied to the demodulating circuit 28 for demodulation purposes. Similarly, the respective I/Q-channel baseband signals derived from the quadrature detecting circuit 25 are A/D-converted into the digital baseband signals by the A/D-converters 29 and 31 which are supplied to the demodulating circuit 32 for demodulation purposes. The output signals filtered from the bandpass filters 19 and 21 are separated and supplied to the level detecting circuits 33 and 34, so that the reception levels thereof are detected.

SUMMARY OF THE INVENTION

In the TDMA transmission system during the empty time while the signal of the receiving channel is not transmitted, the signals of other channels can be received and the levels of these received signals can be measured. To the contrary, the receiver using the conventional FDMA transmission method cannot measure the levels of the other channels with the different frequencies. To monitor the received signal levels of the peripheral zones during the communication operation so as to switch the channels, two series of the signal receiving units are required. As a result, the scale of the receiving circuit employed in the mobile station in the Conventional FDMA transmission system is increased approximately twice as that of the TDMA transmission system. As to the scale, the conventional FDMA transmission system is inferior to the TDMA transmission system.

In the conventional radio communication apparatus, the frequency of the carrier signal is switched by the frequency synthesizer operable in the RF frequency band. As a consequence, no information contained in the carrier signals with the different frequencies can be transmitted and also received in the duplication mode. If the signal transmission and reception are carried out with employment of a plurality of different carrier signals in the conventional FDMA type radio apparatus, then two sets of the transmission unit and the reception unit should be necessarily required.

As is well known in the mobile communication systems, such severe requirements of low power consumption and compactness are required for the mobile station. In view of these severe requirements, two sets of the transmission/reception units would cause serious demerits.

Therefore, the present invention has been made in an attempt to solve the above-described demerits, and has an object to provide a communication apparatus and a communication system, capable of detecting a level of a carrier signal present in other signal channel than the present signal channel under communication, without employing two series of signal transmission/reception units. Furthermore, another object of the present invention is to provide a communication apparatus and a communication method, capable of simultaneously transmitting and receiving a signal to/from a plurality of signal channels without using two series of signal transmission/reception units.

To achieve the above-described objects, according to one aspect of the present invention, a communication apparatus comprises:

a down-converting circuit for converting an input FDMA-transmission signal into an intermediate frequency signal;

a quadrature-detecting circuit for quadrature-detecting the intermediate frequency signal into a baseband signal of an I channel and a baseband signal of a Q channel;

A/D-converting means for A/D-converting the baseband signals of the I/Q channels into digital baseband signals; and first and second converting circuits for converting the digital baseband signals into two sets of signals whose center frequencies are zero, corresponding to two carrier frequencies contained in the input FDMA-transmission signal.

According to another aspect of the present invention, a communication apparatus comprises:

a down-converting circuit for converting an input FDMA-transmission signal into an intermediate frequency signal;

a quadrature-detecting circuit for quadrature-detecting the intermediate frequency signal into a baseband signal of an I channel and a baseband signal of a Q channel;

A/D-converting means for A/D-converting the baseband signals of the I/Q channels into digital baseband signals;

a memory for storing the digital baseband signals of the I/Q channels; and a frequency converting circuit for converting the digital baseband signals read out from the memory into two sets of signals whose center frequencies are zero, corresponding to two carrier frequencies contained in the input FDMA-transmission signal, in a time division mode.

In accordance with another aspect of the present invention, a communication apparatus comprises:

a modulating circuit for digitally modulating information to be transmitted based on each of plural carrier frequencies, thereby to produce a plurality of modulation signals;

an adding circuit for digitally adding the plurality of modulation signals produced from the modulating circuit to each other;

a D/A-converter for D/A-converting the added modulation signal derived from the adding circuit;

a converting circuit for converting the D/A-converted modulation signal derived from the D/A-converter into a high-frequency analog modulation signal; and transmitting means for transmitting the high-frequency analog modulation signal.

In accordance with another aspect of the present invention, a communication system comprising a mobile station, a plurality of base stations for establishing communications to the mobile station in the FDMA system, and a control station coupled with the plurality of base stations, is characterized in that:

the mobile station includes means for simultaneously transmitting the FDMA system signal to the plurality of base stations;

the plurality of base stations includes means for receiving the FDMA system signal transmitted from the mobile station; and the control station includes means for synthesizing the FDMA system signals with each other, received from the plurality of base stations.

According to another aspect of the present invention, a communication system comprising a mobile station, a plurality of base stations for establishing communications to the mobile station in the FDMA system, and a control station coupled with the plurality of base stations, is characterized in that:

the control station includes means for transmitting information to be transmitted to the mobile station to the plurality of base stations;

each of the plural base stations includes means for transmitting the information to the mobile station; and the mobile station includes means for simultaneously receiving the information from the plurality of base stations, and means for synthesizing the information received from the plurality of base stations.

Furthermore, according to another aspect of the present invention, a communication method comprises the steps of:

converting an input FDMA-transmission signal into an intermediate frequency signal;

converting the intermediate frequency signal into baseband signals of an I channel and a Q channel;

A/D-converting the baseband signals to digital baseband signals; and converting the digital baseband signals into two sets of signals whose center frequencies are zero, corresponding to two carrier frequencies contained in the input FDMA-transmission signal.

In accordance with another aspect of the present invention, a communication method comprises the steps of:

converting an input FDMA-transmission signal into an intermediate frequency signal;

converting the intermediate frequency signal into baseband signals of an I channel and a Q channel;

A/D-converting the baseband signals to digital baseband signals;

storing the digital baseband signals into a memory; and converting the digital baseband signals read out from the memory into two sets of signals whose center frequencies are zero, corresponding to two carrier frequencies contained in the input FDMA-transmission signal in a time division mode.

Moreover, according to another aspect of the present invention, a communication method comprises the steps of:

digitally modulating information to be transmitted based on each of plural carrier frequencies, thereby to produce a plurality of modulation signals;

digitally adding the plurality of modulation signals produced from the modulating step to each other;

D/A converting the added modulation signal derived from the adding step;

converting the D/A-converted modulation signal derived from the D/A-converting step into a high-frequency analog modulation signal; and transmitting the high-frequency analog modulation signal.

In accordance with a further aspect of the present invention, a communication method applied to such a communication system comprising a mobile station, a plurality of base stations for establishing communications to the mobile station in the TDMA system, and a control station coupled with the plurality of base stations, is characterized in that:

the mobile station simultaneously transmits the FDMA system signal to the plurality of base stations;

the plurality of base stations receive the FDMA system signal transmitted from the mobile station; and the control station synthesizes the FDMA system signals with each other, received from the plurality of base stations.

In accordance with a still further aspect of the present invention, a communication method applied to a communication system a mobile station, a plurality of base stations for establishing communications to the mobile station in the FDMA system, and a control station coupled with the plurality of base stations, is characterized in that:

the control station transmits information to be transmitted to the mobile station to the plurality of base stations;

each of the plural base stations transmits the information to the mobile station; and the mobile station simultaneously receives the information from the plurality of base stations, and synthesizes the information received from the plurality of base stations.

As previously explained according to the present invention, the FDMA-system input signal is frequency-converted into the intermediate frequency signal which is further converted into the baseband signals in the I/Q channels. The I/Q-channel baseband signals are converted into the digital baseband signals. Then, the digital baseband signals are converted into the two signals whose center frequencies become zero, corresponding to the two carrier frequencies contained in the FDMA-system input signal. The digital baseband signals are one stored into the memory, and then, the digital baseband signals are read out and may be converted into the two signals whose center frequencies are zero, corresponding to the two carrier frequencies contained in the FDMA-system input signal, in the time division mode. As a result, one of these two signal is demodulated whereas the other signal thereof is level-detected. Alternatively, these two signals may be demodulated.

The information to be transmitted is digitally modulated with a plurality of carrier frequencies, respectively, to produce a plurality of modulation signals. These modulation signals are digitally added to each other and D/A-converted into the digital data. The digital data are further D/A-converted into the analog signals which are converted into the RF signals, which will then be transmitted. The modulation signals may be produced by digitally modulating the information with a plurality of carrier frequencies in the time division mode.

In accordance with the present invention, in the up link channel, the mobile station simultaneously transmits the signals to a plurality of base stations, and the plural base stations receives the information transmitted from the mobile station. Then, plural pieces of the information received from the plural base stations are synthesized by the control station. In the down link channel, the control station transmits the information to be transmitted to the mobile station to the plural base stations, and the information about the plural base stations is transmitted to the mobile station. Then, the mobile station synthesizes the information which is simultaneously received from the plurality of base stations.

The above and other objects, effects, features and advantages of the present invention will become more apparent from the following description of the embodiment thereof taken in conjunction with the accompanying drawings.

DETAILED DESCRIPTION OF THE PREFERRED EMBODIMENTS

Referring to the accompanying drawings, FDMA communication method/apparatus/system according to the present invention will be described in detail.

[First Embodiment]

Figure 3:
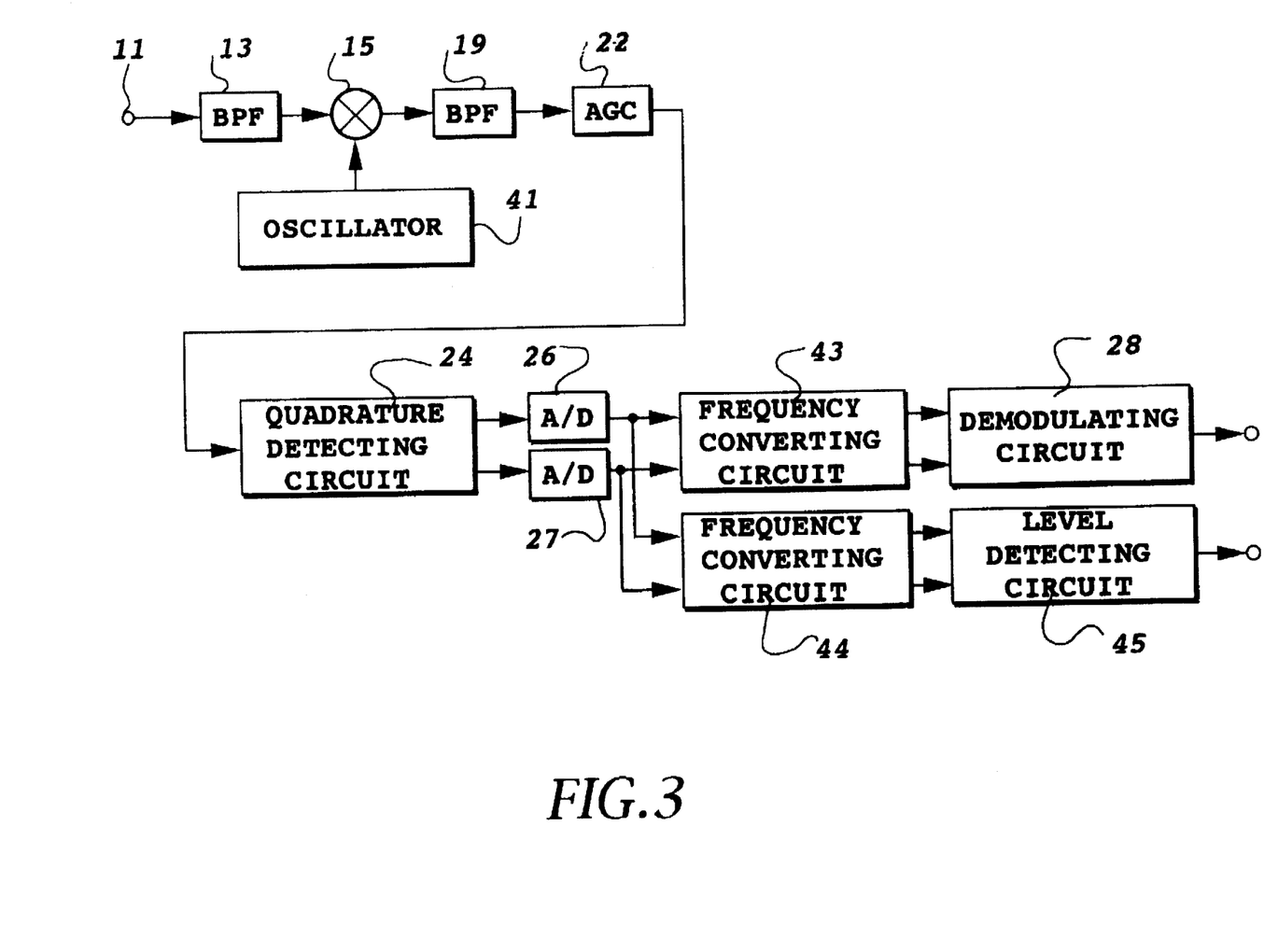
FIG. 3 schematically illustrates a circuit block diagram of a receiving circuit employed in a communication apparatus according to a first preferred embodiment of the present invention.

In FIG. 3, there is shown an overall circuit arrangement of a receiving circuit employed in an FDMA communication system, according to a first preferred embodiment of the present invention. It should be noted that the same reference numerals shown in FIG. 2 are employed as those for denoting the same or similar elements represented in the following drawings.

In the first receiving circuit of FIG. 3, an input signal received at the input terminal 11 is not subdivided into two sets of input signal, but is directly supplied to a bandpass filter (BPF) 13. Then, the input signal filtered by this bandpass filter 13 is frequency-mixed in a mixer 15 with a local oscillation signal having a fixed frequency, derived from a fixed (local) oscillator 41. As a result, the input RF (radio frequency) signal is converted into an intermediate frequency signal, while being multiplexed on the frequency domain. In other words, these mixer 15 and bandpass filter 19 constitute a down-converting circuit. The intermediate frequency (IF) signal is amplified in a linear fashion by a predetermined signal level in an automatic gain control (AGC) circuit 22. Furthermore, the gain-controlled IF signal is quadrature-detected by a quadrature detecting circuit 24 in such a manner that, for instance, this IF signal is quadrature-detected to produce I and Q channels, while one-end frequency over the entire band is used as a local signal. These I/Q channel signals are mutually offset by such frequency components corresponding to the respective carrier signals contained in a plurality of input RF signals.

The detection signals of the I/Q channels are A/D-converted by A/D converters 26 and 27 into digital signals, respectively. Then, the digital signals are frequency-converted by corresponding frequency converting circuits 43 and 44, so that such signals contained in the input RF signal, corresponding to two channels of interest, are outputted as signals whose center frequencies are zero. Thereafter, these frequency-converted signals are supplied to a demodulating circuit 28 and a level detecting circuit 45, respectively. In one frequency converting circuit 43, the digital quadrature-detected signal in the channel under communication operation is converted into I/Q baseband signals whose center frequencies are zero. When a level detection of a designated carrier signal of the peripheral zone is carried out, this designated carrier signal is converted into I/Q baseband signals whose center frequencies are zero in the other frequency converting circuit 44. Then, these I/Q baseband signals are processed in the level detecting circuit 45 in such a manner that a calculation is made of square summation ($I^2+Q^2$) of the respective amplitudes of these I/Q baseband signals.

Figure 4A:
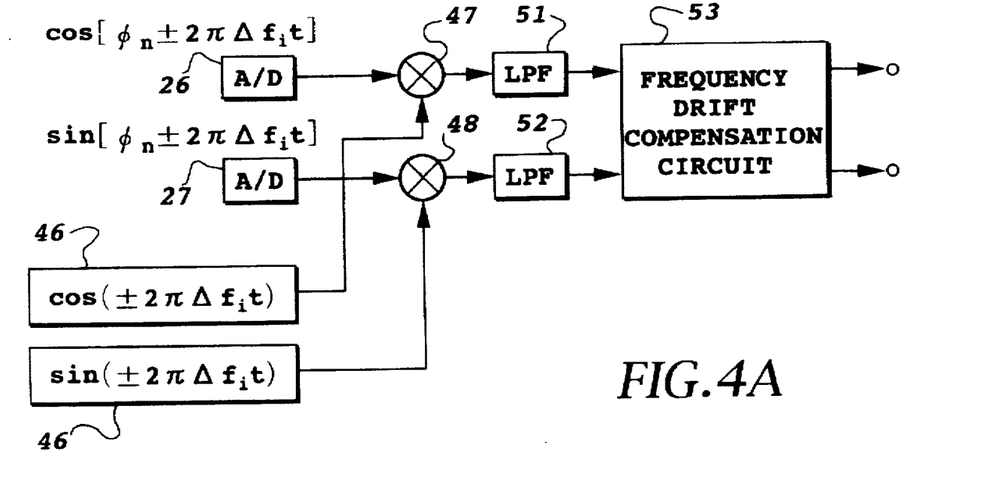
FIG. 4A is a schematic block diagram for representing internal circuit arrangements of the frequency converting circuits 43 and 44 employed in the receiving circuit of FIG. 3.

An internal circuit arrangement of the frequency converting circuit 43 is constructed as, for instance, shown in FIG. 4A. As seen from FIG. 4A, the digital signals cos $[\Phi n \pm 2\pi\Delta fit]$ and $\sin[\Phi n \pm 2\pi\Delta fit]$ derived from the A/D converters 26 and 27 are multiplied with digital local signals cos $(\pm 2\pi\Delta fit)$ and $\sin(\pm 2\pi\Delta fit)$ derived from local signal generators 46 by multipliers 47 and 48, respectively. The multiplied output signals are supplied via lowpass filters 51 and 52 to a frequency correcting circuit 53. As indicated in FIG. 3, the local oscillator 41 is a fixed oscillator. Also, the local signal generators 45 and 46 may change the local signal frequencies, but does not follow the carrier frequency of the channel of interest for this input intermediate frequency signal, so that the quasi-synchronization type quadrature detection is carried out. As a result, the quadrature-detected signals contain frequency errors and fixed phase errors. These errors may be corrected by way of the digital processing in the frequency correcting circuit 53.

Figure 4B:
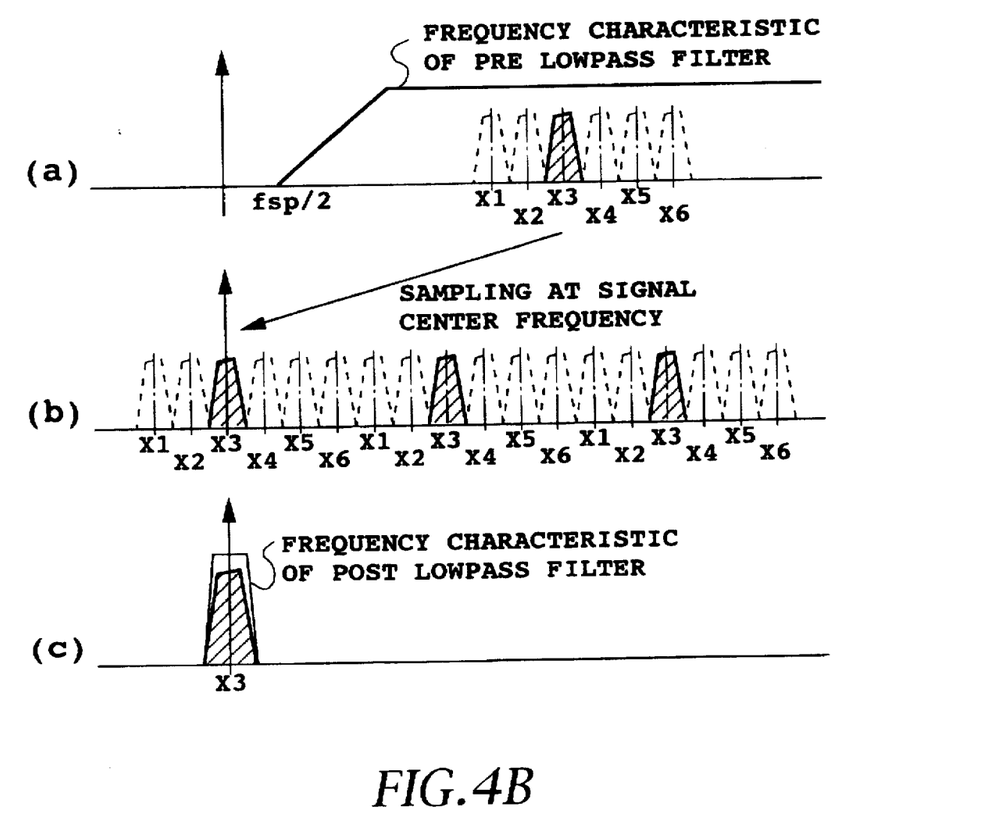
FIG. 4B explanatorily shows the frequency converting method employed in the receiving circuit of FIG. 3.

It should be noted that the frequency conversion by way of this digital processing may be realized by employing the frequency converting filter as described in Japanese Patent Application NO. 4-199018 (filed in 1992). For instance, as illustrated in FIG. 4B, the frequency converting manner is explanatorily performed. That is, the low frequency signal is previously removed by the lowpass filter with respect to the signal components of the quadrature-detected signal, which have been frequency-offset (see FIG. 4B-a). Then, the lowpass-filtered signal this components are sampled at this center frequency in correspondence with each of these offset frequencies, so that the folded signal components whose center frequencies are zero are produced (see FIG. 4B-b). Finally, the folded signal components are derived from the lowpass filter (see FIG. 4B-c). This arrangement may be constituted by the same filter by varying the sampling frequency in accordance with the frequencies of the respective channels.

[Second Embodiment]

Figure 5:
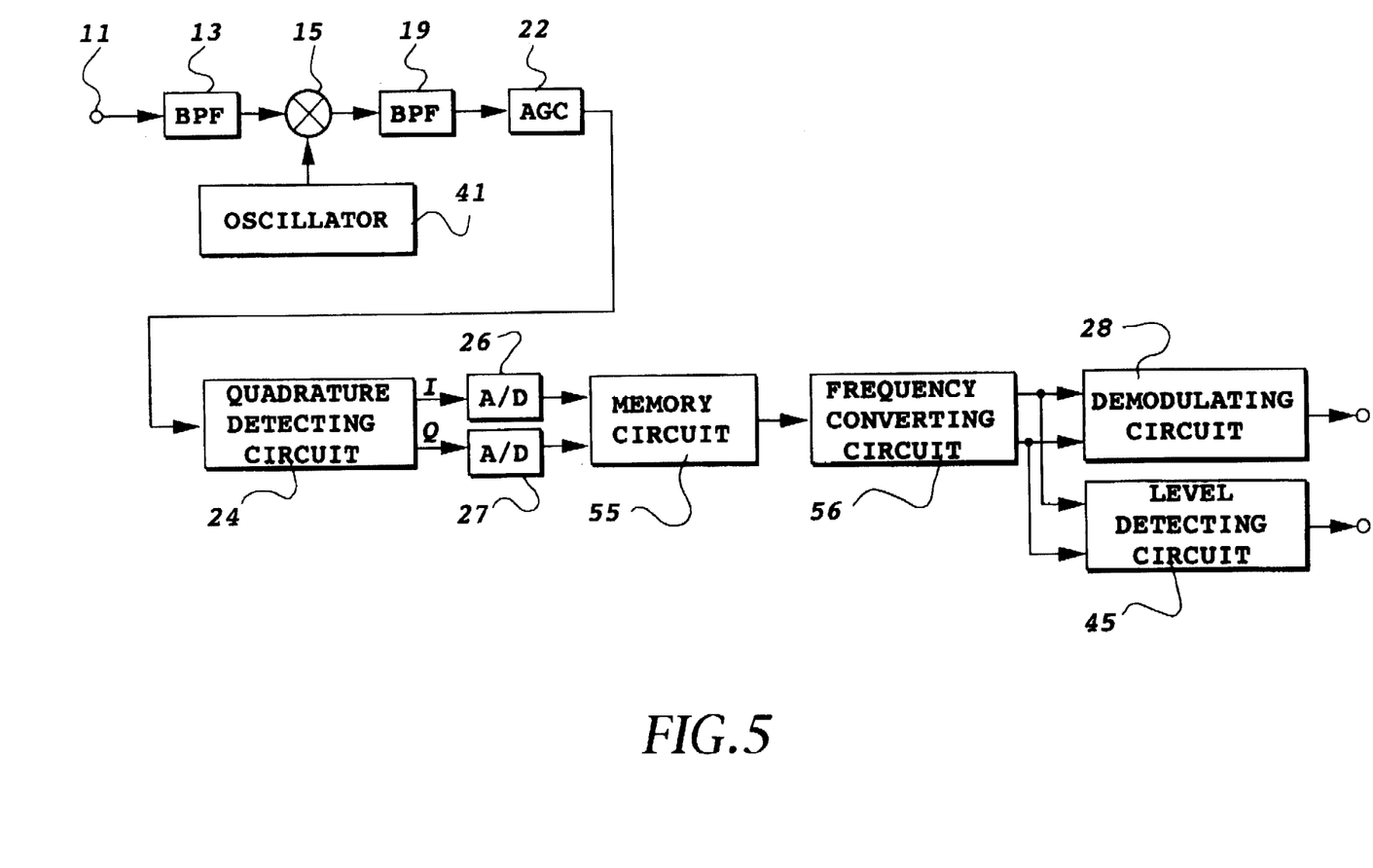
FIG. 5 schematically shows a circuit block diagram of another receiving circuit employed in a communication apparatus according to a second preferred embodiment of the present invention.

FIG. 5 schematically shows a circuit arrangement of another receiving circuit employed in the communication apparatus, according to a second preferred embodiment of the present invention. A major feature of this receiving circuit according to the second embodiment is such that the digital signals derived from the A/D converters 26 and 27 are temporarily stored into a memory circuit 55, and these digital signals are read out from this memory circuit 55 at the reading speed two times higher than the writing speed, and thereafter the read digital signals are supplied to a frequency converting circuit 56. In this frequency converting circuit 56, the same frequency converting process as in the above-described frequency converting circuit 43 shown in FIG. 3 is performed in synchronism with the even-numbered reading clocks of the memory circuit 55, whereas the same frequency converting process as in the above-mentioned frequency converting circuit 44 indicated in FIG. 3 is carried out in synchronism with the odd-numbered reading clocks of this memory circuit 55. The output signal from the frequency converting circuit 56 is supplied to the demodulating circuit 28 and the level detecting circuit 45. In this demodulating circuit 28, the demodulating process is performed in synchronism with the even-numbered reading clocks of the memory circuit 55. On the other hand, the level detecting process by the level detecting circuit 45 is performed in synchronism with the odd-numbered reading clocks of the memory circuit 55.

[Third Embodiment]

Figure 6:
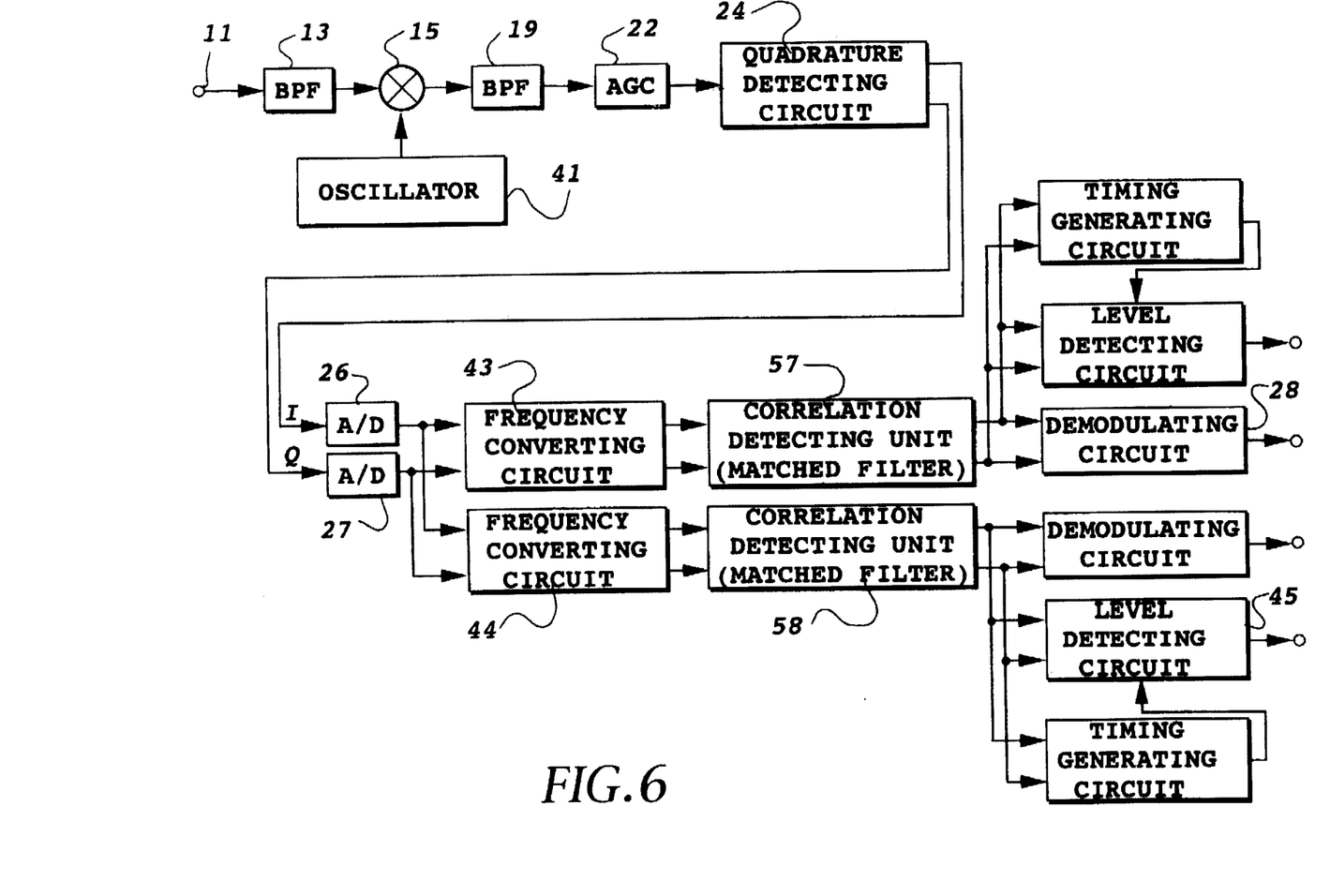
FIG. 6 schematically indicates a circuit block diagram of another receiving circuit employed in a communication apparatus according to a third preferred embodiment of the present invention.

FIG. 6 is a schematic circuit block diagram of another receiving circuit for a mobile station having a plurality of carrier signals, for performing the CDMA (code division multiple access) transmission, according to a third preferred embodiment of the present invention. In this receiving circuit, the spread signals having the different carrier frequencies are first converted into baseband signals whose center signals are zero by the frequency converting circuits 43 and 44. These baseband signals are inverse-converted into narrow band signals by correlation detecting units 57 and 58 based on the spread codes corresponding to the respective received signals.

It should be noted that although two signal series of the baseband signal processing circuits have been employed in the receiving circuit of FIG. 6, alternatively only one signal series of the baseband signal processing circuit may be employed to perform the baseband signal processing operations for several channels succeeding to the frequency converting circuits under such conditions that, as previously explained with respect to the second embodiment, these spread signals are once stored into the memory circuit, and then are processed in the time division method by utilizing the highspeed clock.

[Fourth Embodiment]

Figure 7:
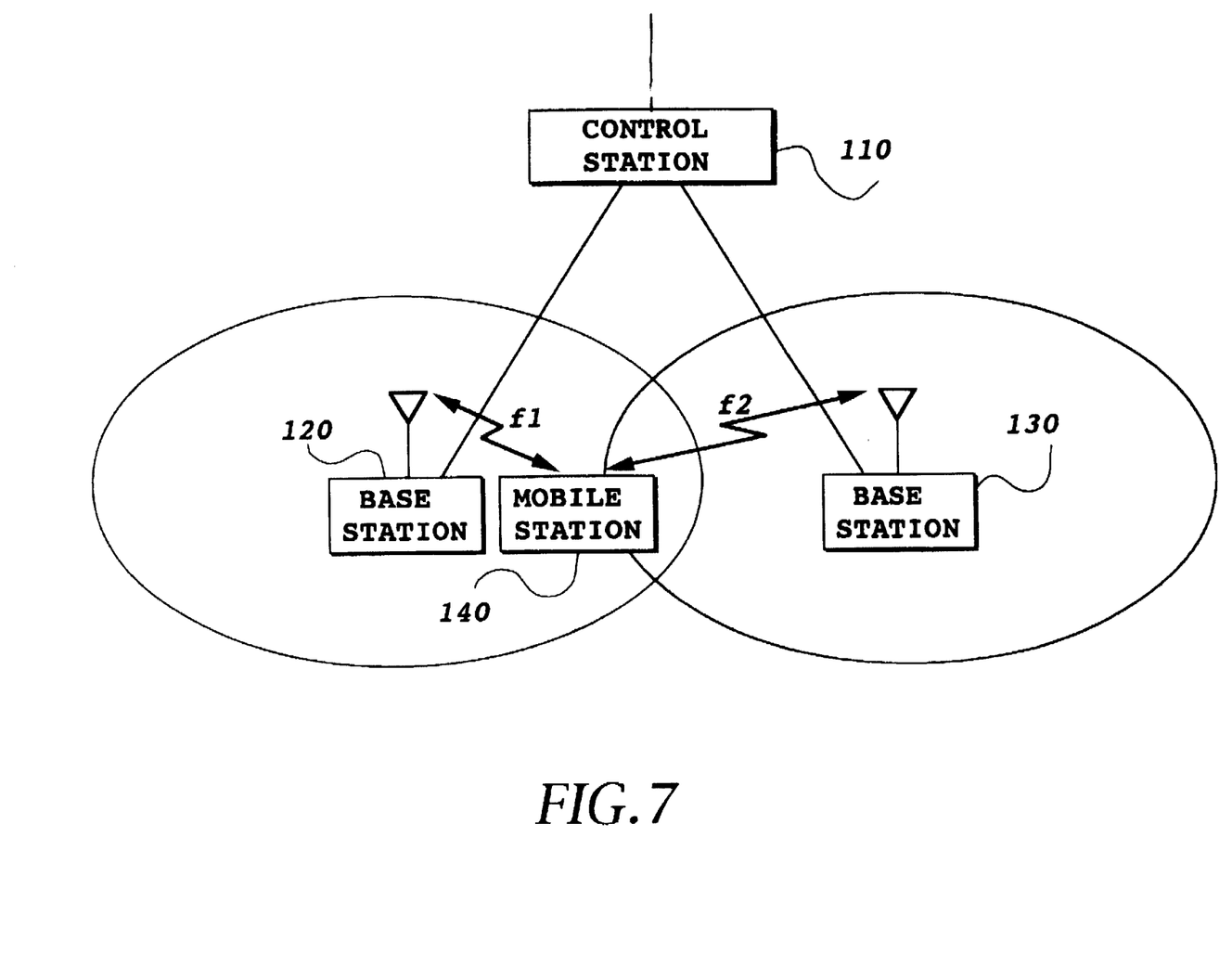
FIG. 7 is an illustration for explaining a hand over effected among carrier signals having different frequencies in the communication network system with employment of the communication apparatus according to the present invention.

In FIG. 7, there is shown a system arrangement of a network system with employment of the communication apparatus according to the present invention.

In this network system, when a mobile station 140 is moved from a zone of one base station 120 to a zone of the other base station 130, hand over (channel switching) is performed. Conventionally, since the carrier signals are switched during this hand over, the communication is instantaneously interrupted. To perform such hand over without instantaneously interrupting the communication, it is conceivable that the same information is transmitted from a plurality of base stations 120 and 130 to the same mobile station 140 by utilizing the carrier signals f1 and f2, respectively. In the up link channel, the base stations 120 and 130 receive the electromagnetic wave transmitted from the same mobile station 140, plural pieces of information are synthesized in a control station 110.

In accordance with the communication apparatuses and the communication methods described in connection with the first to third embodiments, the frequency conversion with respect to the carrier signals having the plural frequencies can be performed without employing two signal processing paths of the receiving circuit. As previously described in connection with the first to third embodiments, one of the plural carrier signals is demodulated and the level of an other carrier signal is detected. To the contrary, in accordance with this fourth embodiment, a demodulating circuit (not shown) is employed to substitute for the level detecting circuit 45 shown in FIG. 3 and FIG. 5. As a consequence, both the control station 110 and the mobile station 140 may demodulate a plurality of carrier signals without employing two signal processing paths of the receiving circuit. Also, as previously explained in the third embodiment, even when the baseband signal processing for several channels is performed by the single series of baseband signal processing circuit in the receiving circuit of FIG. 6, a demodulating circuit (not shown either) is employed instead of the level detecting circuit 45 shown in FIG. 6, so that the demodulation for the plural carrier signals can be performed in a similar manner.

As the method for synthesizing a plurality of signals transmitted from the plural base stations, it is possible to utilize such a maximum ratio synthesis that these transmitted signals are weighted in response to the levels of these signals and then the weighted signals are summed with each other. As a consequence, the highest diversity effect can be achieved, thereby improving the communication quality.

In the up link channel, the mobile station 140 transmits the same information to the base stations 130 and 130 by using a plurality of carrier signals. In the transmitting circuit, a modulating circuit (not shown) is employed to substitute for the demodulating circuit employed in the receiving circuit, and a D/C converter is employed to substitute for the A/D converters 26 and 27. A plurality of digital signals outputted from the frequency converting circuits 43 and 44 are added to each other, and then the added digital signals are inputted into this D/A converter. Similar to the operations described in the embodiment 2, the plural carrier signals are frequency-converted in the time division manner by employing a single frequency converting circuit 56, and then two digital signals which have been frequency-converted may be added to each other. To synchronize two carrier signals outputted in the time division manner, the memory circuit 55 is employed similar to the second embodiment, and then the signals stored in this memory circuit 55 may be added to each other.

The different carrier signals transmitted from the mobile station 140 are received by the plural base stations 120 and 130, and are diversity-synthesized with each other in the control station 110. As a result, the communication quality in the up link channel can be improved.

As previously described, in accordance with the present invention, only a few number of circuit is additionally employed in the conventional FDMA transmission radio apparatus, whereby the levels of the channels of the carrier frequencies other than the channel under communication can be detected without employing two signal receiving circuit paths.

Moreover, according to the communication apparatus of the present invention, the signals can be simultaneously transmitted and received with respect to the plural channels without employing two signal processing paths of each of the transmitting circuit and the receiving circuit.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A communication apparatus comprising: p1 a down-converting circuit for converting an input FDMA-transmission signal into an intermediate frequency signal;

a quadrature-detecting circuit for quadrature-detecting said intermediate frequency signal into a baseband signal of an I channel and a baseband signal of a Q channel;

A/D-converting means for A/D-converting said baseband signals of the I/Q channels into digital baseband signals;

first and second frequency-converting circuits for converting said digital baseband signals into two sets of signals whose center frequencies are zero, corresponding to two carrier frequencies contained in said input FDMA-transmission signal;

a demodulating circuit for demodulating one of said two sets of signal derived from said first and second frequency converting circuits; and level detecting means for detecting a level of the other set of signal derived from said first and second frequency converting circuits.

2. A communication apparatus comprising:

a down-converting circuit for converting an input FDMA-transmission signal into an intermediate frequency signal;

a quadrature-detecting circuit for quadrature-detecting said intermediate frequency signal into a baseband signal of on I channel and a baseband signal of a Q channel;

A/D-converting means for A/D-converting said baseband signals of the I/Q channels into digital baseband signals;

a memory for storing said digital baseband signals of the I/Q channels;

a frequency converting circuit for converting said digital baseband signals read out from said memory into two sets of signals whose center frequencies are zero, corresponding to two carrier frequencies contained in said input FDMA-transmission signal, in a time division mode;

a demodulating circuit for demodulating one of said two sets of signal derived from the frequency converting circuits; and level detecting means for detecting a level of the other set of signals derived from said frequency converting circuit.

3. A communication apparatus as claimed in claim 1, or 2, wherein the level detecting means is substituted by a second demodulating circuit for demodulating the other set of signal derived from said frequency converting circuit.

4. A Multiple access communication apparatus for communicating between a mobile station and a plurality of base stations, comprising:

a modulating circuit for digitally modulating information to be transmitted based on each of a plurality of carrier frequencies, thereby producing a plurality of modulating signals;

a plurality of frequency converting circuits for converting the plurality of the modulating signals into a plurality of digital baseband signals;

an adding circuit for digitally adding the plurality of the digital baseband signals;

a D/A converter for D/A-converting the added digital baseband signals derived from said adding circuit;

a converting circuit for converting the D/A-converted digital baseband signal derived from said D/A-converter into a high-frequency analog modulation signal; and transmitting means for transmitting said high-frequency analog information signal.

5. A communication apparatus as claimed in claim 4 wherein said modulating circuit digitally modulates said information based on each of the plurality of the carrier frequencies in a time division mode.

6. A multiple access communication FDMA system for communicating between a mobile station and a plurality of base stations, said system comprising the mobile station, the plurality of the base stations for establishing communications to said mobile station in the FDMA system, and a control station coupled with said plurality of base stations, wherein;

said mobile station includes means for simultaneously transmitting the FDMA system signal to said plurality of base stations;

said plurality of base stations include means for receiving said FDMA system signal transmitted from said mobile station; and said control station includes means for synthesizing said FDMA system signals received from said plurality of base stations.

7. A multiple access communication FDMA system for communicating between a mobile station and a plurality of base stations, said system comprising the mobile station, the plurality of the base stations for establishing communications to said mobile station with the FDMA system, and a control station coupled with said plurality of base stations, wherein:

said control station includes means for transmitting information to be transmitted to said mobile station to said plurality of base stations;

each of said plurality of bases stations includes means for transmitting said information to said mobile station; and said mobile station includes means for simultaneously receiving said information from said plurality of base stations, and means for synthesizing said information received from said plurality of base stations.

8. A multiple access communication method for a FDMA system, comprising the steps of:

converting an input FDMA-transmission signal into an intermediate frequency signal;

converting said intermediate frequency signal into baseband signals;

A/D-converting said baseband signals to digital baseband signals;

converting said digital baseband signals into two sets of signals whose center frequencies are zero, corresponding to two carrier frequencies contained in said input FDMA-transmission signal; and detecting a level of one of said two sets of signals derived from the last converting step while demodulating the other set of signals.

9. A multiple access communication method for a FDMA system, comprising the steps of:

frequency-converting an input FDMA-transmission signal into an intermediate frequency signal;

converting said intermediate frequency signal into baseband signals;

A/D-converting said baseband signals to digital baseband signals;

storing said digital baseband signals into a memory;

converting said digital baseband signals read out from said memory into two sets of signals whose center frequencies are zero, corresponding to two carrier frequencies contained in said input FDMA-transmission signal in a time division mode; and detecting a level of one of said two sets of signals derived from the last converting step while demodulating the other set of signals.

10. A multiple access communication method for a FDMA system, comprising the steps of:

converting an input FDMA-transmission signal into an intermediate frequency signal;

converting said intermediate frequency signal into baseband signal;

A/D-converting said baseband signal to digital baseband signal;

converting said digital baseband signals into two sets of signals whose center frequencies are zero, corresponding to two carrier frequencies contained in said input FDMA-transmission signal; and demodulating said two sets of signals derived from said last converting step.

11. A multiple access communication method for communicating between a mobile station and a plurality of base stations, comprising the steps of:

digitally modulating information to be transmitted based on each of a plurality of carrier frequencies, thereby producing a plurality of modulation signals;

converting the plurality of the modulating signals into a plurality of digital baseband signals;

digitally adding the plurality of the digital baseband signals;

D/A converting the added digital baseband signal derived from said adding step;

converting the D/A-converted digital baseband signal derived from said D/A-converting step into a high-frequency analog modulation signal; and transmitting said high-frequency analog modulation signal.

12. A multiple access communication method as claimed in claim 11 wherein said digitally modulating step digitally modulates said information based on each of the plurality of carrier frequencies in a time division mode.

13. A multiple access communication method applied to a FDMA communication system for communicating between a mobile station and a plurality of base stations, said system comprising the mobile station, the plurality of the base stations for establishing communications to said mobile station in the FDMA system, and a control station coupled with said plurality of base stations, wherein;

said mobile station simultaneously transmits the FDMA system signal to said plurality of base stations;

said plurality of base stations receive said FDMA system signal transmitted from said mobile station; and said control station synthesizes said FDMA system signals received from said plurality of base stations.

14. A multiple access communication method applied to a FDMA communication system for communicating between a mobile station and a plurality of base stations, said system comprising the mobile station, the plurality of the base stations for establishing communications to said mobile station in the FDMA system, and a control station coupled with said plurality of base stations, wherein:

said control station transmits information to be transmitted to said mobile station to said plurality of base stations;

each of said plurality of base stations transmits said information to said mobile station; and said mobile station simultaneously receives said information from said plurality of base stations, and synthesizes said information received from said plurality of base stations.

15. A communication system comprising:
(i) a receiver including:
   (a) a down-converting circuit for converting an input FDMA-transmission signal into an intermediate frequency signal;
   (b) a quadrature-detecting circuit for quadrature-detecting said intermediate frequency signal into a baseband signal of an I channel and a baseband signal of a Q channel;
   (c) A/D-converting means for A/D-converting said baseband signals of the I/Q channels into digital baseband signals;
   (d) a frequency-converting circuit for converting said digital baseband signals into two sets of signals whose center frequencies are zero, corresponding to two carrier frequencies contained in said input FDMA-transmission signal;
   (e) a demodulating circuit for demodulating one of said two sets of signals derived from said frequency converting circuit; and;
   (f) level detecting means for detecting a level of the other set of signal derived from said frequency converting circuit; and
(ii) a transmitter including:
   (g) a modulating circuit for digitally modulating information to be transmitted based on each of the plurality of the carrier frequencies, thereby producing a plurality of modulation signals;
   (h) an adding circuit for digitally adding said plurality of modulation signals produced from the modulation circuit;
   (i) a D/A-converter for D/A-converting the added modulation signal derived from said adding circuit;
   (j) a converting circuit for converting the D/A-converted modulation signal derived from said D/A-converted modulation signal derived from said D/A-converter into a high-frequency analog modulation signal; and
   (k) transmitting means for transmitting said high-frequency analog modulation signal.

16. A FDMA communication system comprising a mobile station, a plurality of base stations for establishing communications to said mobile station is the FDMA system, and a control station coupled with said plurality of base stations, wherein:

said control station includes means for transmitting information to be transmitted to said mobile station to said plurality of base stations;

each of said plurality of base stations include means for transmitting said information to said mobile station; and said mobile station includes;

a down-converting circuit for converting an input FDMA-transmission signal into an intermediate frequency signal:

a quadrature-detecting said intermediate frequency signal into a baseband signal an I channel and a baseband signal of a Q channel;

A/D-converting means for A/D-converting said baseband signals of the I/Q channels into digital baseband signals;

first and second frequency-converting circuits for converting said digital baseband signals into two sets of signals whose center frequencies are zero, corresponding to two carrier frequencies contained in said input FDMA-transmission signal;

a demodulating circuit for demodulating one of said two sets of signal derived from said frequency converting circuit; and level detecting means for detecting a level of the other set of signal derived from said frequency converting circuit.

17. A receiver in multiple access FDMA communication system comprising:

a common signal processing path for processing an input FDMA transmission signal into baseband signals;

a frequency converter connected to the common signal processing path for generating at least two carrier signals;

a demodulator circuit for demodulating one of the carrier signals being communicated in a signal channel; and a level detector for detecting a level of the other carrier signal present in a channel other than the signal channel being communicated.

* * * * *